United States Patent
Kamei et al.

(10) Patent No.: US 10,873,874 B2
(45) Date of Patent: Dec. 22, 2020

(54) BASE STATION, RADIO RELAY STATION, AND COMMUNICATION METHOD FOR CANCELLING A CONNECTION TO A BASE STATION DURING AN OVERLOAD CONDITION

(71) Applicant: NEC CORPORATION, Tokyo (JP)

(72) Inventors: Akira Kamei, Tokyo (JP); Toru Yamada, Tokyo (JP); Kyoji Hirata, Tokyo (JP); Masahiro Serizawa, Tokyo (JP); Yumiko Okuyama, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/496,120

(22) PCT Filed: Jan. 24, 2018

(86) PCT No.: PCT/JP2018/002038
§ 371 (c)(1),
(2) Date: Sep. 20, 2019

(87) PCT Pub. No.: WO2018/173461
PCT Pub. Date: Sep. 27, 2018

(65) Prior Publication Data
US 2020/0037202 A1    Jan. 30, 2020

(30) Foreign Application Priority Data

Mar. 23, 2017 (JP) .................................. 2017-056954

(51) Int. Cl.
*H04W 36/00* (2009.01)
*G08C 15/00* (2006.01)
(Continued)

(52) U.S. Cl.
CPC .... *H04W 28/0284* (2013.01); *H04B 7/15507* (2013.01); *H04W 28/0215* (2013.01);
(Continued)

(58) Field of Classification Search
CPC ............. H04W 28/0284; H04W 76/27; H04W 28/0215; H04W 84/042; H04W 88/08;
(Continued)

(56) References Cited

U.S. PATENT DOCUMENTS

| | | | |
|---|---|---|---|
| 2010/0103857 A1* | 4/2010 | Ulupinar | H04L 29/12207 370/313 |
| 2011/0110270 A1* | 5/2011 | Leng | H04B 7/2606 370/254 |

(Continued)

FOREIGN PATENT DOCUMENTS

| | | |
|---|---|---|
| JP | 2009-534899 A | 9/2009 |
| WO | 2011/030836 A1 | 3/2011 |
| WO | 2016/163546 A1 | 10/2016 |

OTHER PUBLICATIONS

"Rapporteur Correction of X2AP", Ericsson, 3GPP TSG-RAN WG3 Meeting #79, R3-130302, Malta, Jan. 28-Feb. 1, 2013. pp. 33, 34, and 54-57.*

(Continued)

*Primary Examiner* — Rafael Pérez-Gutiérrez
*Assistant Examiner* — Mark G. Pannell
(74) *Attorney, Agent, or Firm* — Sughrue Mion, PLLC

(57) ABSTRACT

The present disclosure aims to provide a base station, a radio relay station, a communication method, and a program capable of preventing communication from being unavailable when the base station is brought into a high load condition. A base station (10) configured to communicate with a communication terminal (30) through a radio relay station (20), the base station (10) including: a control unit (Continued)

(11) configured to detect whether the own apparatus is in an overload condition exceeding a predetermined load; and a communication unit (12) configured to transmit, in order to cause the radio relay station (20) to connect to another base station that is not in an overload condition, information about the other base station to the radio relay station (20) when the control unit (11) detects that the own apparatus is in an overload condition.

5 Claims, 9 Drawing Sheets

(51) Int. Cl.
*H04L 12/28* (2006.01)
*H04W 28/02* (2009.01)
*H04B 7/155* (2006.01)
*H04W 76/27* (2018.01)
*H04W 84/04* (2009.01)
*H04W 88/08* (2009.01)
*H04W 92/20* (2009.01)
*H04L 29/08* (2006.01)

(52) U.S. Cl.
CPC .............. *H04W 76/27* (2018.02); *H04L 67/12* (2013.01); *H04W 84/042* (2013.01); *H04W 88/08* (2013.01); *H04W 92/20* (2013.01)

(58) Field of Classification Search
CPC ............... H04W 92/20; H04B 7/15507; H04B 7/15528; H04L 67/12
USPC ......................................... 455/436
See application file for complete search history.

(56) References Cited

U.S. PATENT DOCUMENTS

| | | | | |
|---|---|---|---|---|
| 2012/0099516 | A1* | 4/2012 | Hapsari | H04W 36/06 370/315 |
| 2012/0322363 | A1* | 12/2012 | Tsubouchi | H04B 7/155 455/9 |
| 2013/0083721 | A1* | 4/2013 | Wu | H04W 36/0055 370/315 |
| 2013/0137438 | A1* | 5/2013 | Serravalle | H04B 7/2606 455/437 |
| 2013/0229942 | A1* | 9/2013 | Kubota | H04W 36/22 370/252 |
| 2014/0301371 | A1* | 10/2014 | Maeda | H04W 36/0016 370/331 |
| 2014/0370900 | A1* | 12/2014 | Byun | H04W 36/0055 455/437 |
| 2016/0057787 | A1* | 2/2016 | Nakayasu | H04W 76/10 370/329 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 3GPP TS 36.300, V14.1.0, Dec. 2016, 317 pages.
International Search Report for PCT/JP2018/002038 dated Apr. 3, 2018 [PCT/ISA/210].

* cited by examiner

BASE STATION, RADIO RELAY STATION, AND COMMUNICATION METHOD FOR CANCELLING A CONNECTION TO A BASE STATION DURING AN OVERLOAD CONDITION

CROSS REFERENCE TO RELATED APPLICATIONS

This application is a National Stage of International Application No. PCT/JP2018/002038 filed Jan. 24, 2018, claiming priority based on Japanese Patent Application No. 2017-056954 filed on Mar. 23, 2017, the disclosure of which is incorporated herein in its entirety by reference.

TECHNICAL FIELD

The present disclosure relates to a base station, a radio relay station, a communication method, and a program.

BACKGROUND ART

The 3rd Generation Partnership Project (3GPP), which defines standards for mobile communication technology, determines that relay technology is supported to extend the area covered by a base station.

Non-Patent Literature 1 discloses a configuration for achieving relay technology. Specifically, it discloses a configuration in which a radio relay station RN (Relay Node) relays a radio signal transmitted between a base station DeNB (Donor evolved Node B) and a communication terminal UE (User Equipment). The radio relay station RN has some of functions of the base station eNB and uses the function to perform radio communication with the communication terminal UE. Further, the radio relay station RN has some of functions of the communication terminal UE, and uses the function to connect to the base station DeNB.

Further, under normal conditions, it is not assumed that the radio relay station RN will be moved and it is thus installed at a predetermined place. Therefore, the radio relay station RN does not have a function of performing an inter-cell handover which is a technique in which it is assumed that it will be moved.

CITATION LIST

Non Patent Literature

Non-patent Literature 1: 3GPP TS 36.300 V14.1.0 (2016 December)

SUMMARY OF INVENTION

Technical Problem

A widespread use of Internet Of Things (IoT) terminals in the future will cause the base station DeNB and the radio relay station RN to communicate with a large number of IoT terminals. Accordingly, the base station DeNB needs to secure communication resources relating to not only the communication terminal UE or the IoT terminal directly performing communication but also the communication terminal UE or the IoT terminal communicating through the relay station RN. However, the communication resources possessed by the base station DeNB are limited and thus the base station DeNB is brought into a high load condition when the number of IoT terminals increases. This causes a problem that the communication terminal UE or the IoT terminal cannot communicate with the base station DeNB.

An object of the present disclosure is to provide a base station, a radio relay station, a communication method, and a program capable of preventing communication from being unavailable when the base station is brought into a high load condition.

Solution to Problem

A base station according to a first aspect of the present disclosure is a base station configured to communicate with a communication terminal through a radio relay station, the base station including: a control unit configured to detect whether the own apparatus is in an overload condition exceeding a predetermined load; and a communication unit configured to transmit, in order to cause the radio relay station to connect to another base station that is not in an overload condition, information about the other base station to the radio relay station when the control unit detects that the own apparatus is in an overload condition.

A radio relay station according to a second aspect of the present disclosure is a radio relay station configured to relay communications between a base station and a communication terminal, the radio relay station including a communication unit configured to cancel, when information about a second base station that is different from a first base station in a connected state is received from the first base station that is in an overload condition exceeding a predetermined load, a connection to the first base station and connect to the second base station.

A communication method according to a third aspect of the present disclosure is a communication method performed in a base station configured to communicate with a communication terminal through a radio relay station, the communication method including: detecting whether the base station is in an overload condition exceeding a predetermined load; and transmitting, in order to cause the radio relay station to connect to another base station that is not in an overload condition, information about the other base station to the radio relay station.

A program according to a fourth aspect of the present disclosure is a program for causing a computer that is a base station configured to communicate with a communication terminal through a radio relay station, the program causing the computer to execute: detecting whether the base station is in an overload condition exceeding a predetermined load; and transmitting, in order to cause the radio relay station to connect to another base station that is not in an overload condition, information about the other base station to the radio relay station.

Advantageous Effects of Invention

According to the present disclosure, it is possible to provide a base station, a radio relay station, a communication method, and a program capable of preventing communication from being unavailable when the base station is brought into a high load condition.

DESCRIPTION OF EMBODIMENTS

First Example Embodiment

Figure 1:
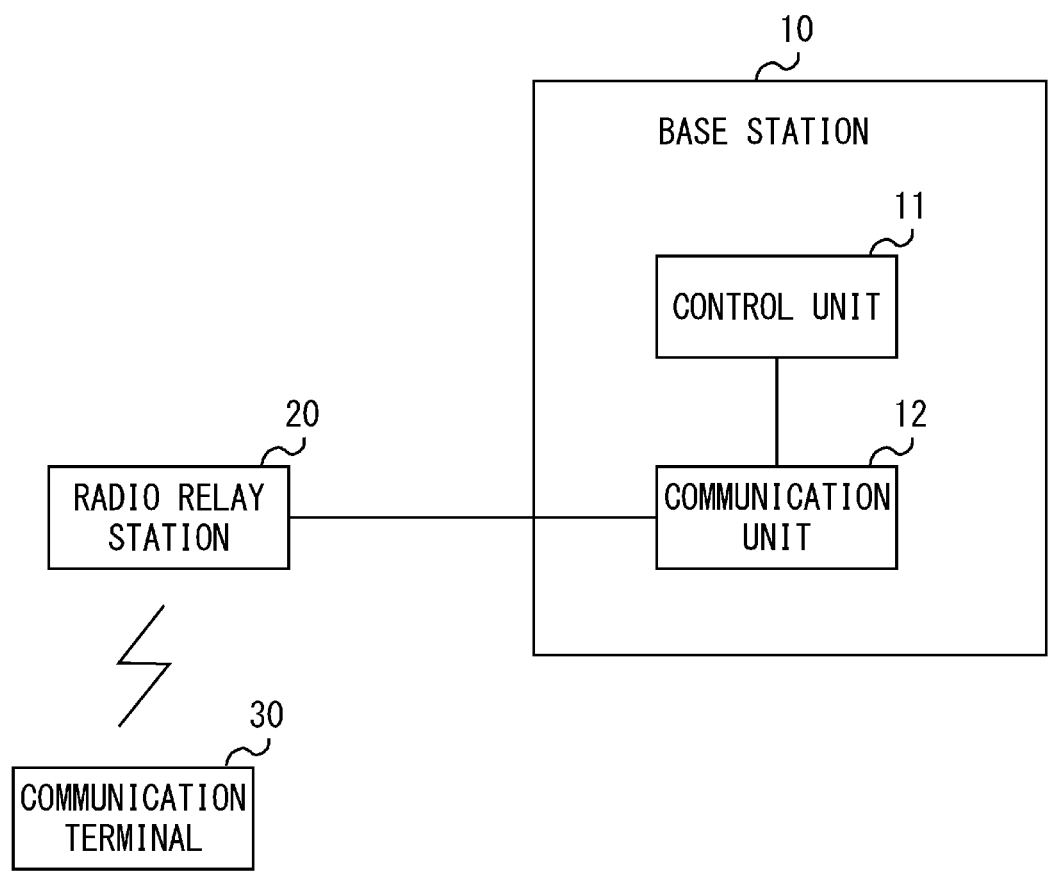
FIG. 1 is a configuration diagram of a communication system according to a first example embodiment.

Embodiments of the present disclosure are described hereinafter with reference to the drawings. First, a configuration example of a communication system according to a first example embodiment is described with reference to FIG. 1. The communication system in FIG. 1 includes a base station 10, a radio relay station 20, and a communication terminal 30. The base station 10, the radio relay station 20 and the communication terminal 30 may be a computer device that operates by a processor executing a program stored in a memory. The processor may be, for example, a microprocessor, a Micro Processing Unit (MPU) or a Central Processing Unit (CPU). The memory may be a volatile memory, a nonvolatile memory, or may be composed of a combination of a volatile memory and a nonvolatile memory. The processor executes one or a plurality of programs including a group of instructions for causing a computer to perform algorithms described with reference to the following drawings.

The base station 10 communicates with the communication terminal 30 through the radio relay station 20. The base station 10 may be a DeNB, the specifications of which are defined in 3GPP. Further, the wireless relay station 20 may be an RN, the specifications of which are defined in 3GPP. Further, the communication terminal 30 may be a UE, the specifications of which are defined in 3GPP. The wireless relay station 20 performs radio communication with the base station 10 and the communication terminal 30.

Next, a configuration example of the base station 10 is described. The base station 10 includes a control unit 11 and a communication unit 12. The control unit 11 and the communication unit 12 may be software or modules, the processing of which is executed by a processor executing a program stored in a memory. Alternatively, the control unit 11 and the communication unit 12 may be hardware such as circuits or chips.

The control unit 11 measures a load condition of the base station 10, and detects whether the base station 10 is in an overload condition exceeding a predetermined load. The load may be, for example, the number of radio relay stations 20 and communication terminals 30 that communicate with the base station 10, the amount of data processed by the base station 10, the Central Processor Unit (CPU) usage rate of the base station 10, or the memory usage rate of the base station 10. The control unit 11 may detect that the base station 10 is in an overload condition when a value of the load, such as the number of radio relay stations 20 and communication terminals 30 that communicate with the base station 10, exceeds a predetermined threshold. Alternatively, the control unit 11 may detect that the base station 10 is in an overload condition when it receives a notification indicating that the base station 10 is in an overload condition.

When the control unit 11 detects that the base station 10 is in an overload condition, the communication unit 12 transmits, to the radio relay station 20, information about another base station in order to cause the radio relay station 20 to connect to the other base station that is not in an overload condition. The other base station may be, for example, a DeNB having a function or an interface connectable to a radio relay station. Further, the other base station may be a base station which does not exceed a predetermined load. The information about the other base station may be, for example, identification information identifying the other base station. Specifically, the identification information may be an Internet Protocol (IP) address or the like.

The radio relay station 20 may determine that the base station 10 is in an overload condition by receiving the information about the other base station. In this case, the radio relay station 20 has received the information about the other base station and thus can cancel the connection to the base station 10 and newly connect to the other base station. That is, the base station 10 can prompt the radio relay station 20 to connect to the other base station by transmitting the information about the other base station to the radio relay station 20.

As described above, the base station 10 in FIG. 1 can transmit, when it is in an overload condition, information about another base station to the radio relay station 20 in a connected state, in order to cause the radio relay station 20 to connect to the other base station. This allows the base station 10 in an overload condition to reduce the number of apparatuses that the base station 10 communicates with, thereby eliminating the overload condition. As a result, the base station 10 can prevent deterioration in quality such as a communication stoppage due to an overload condition.

Second Example Embodiment

Figure 2:
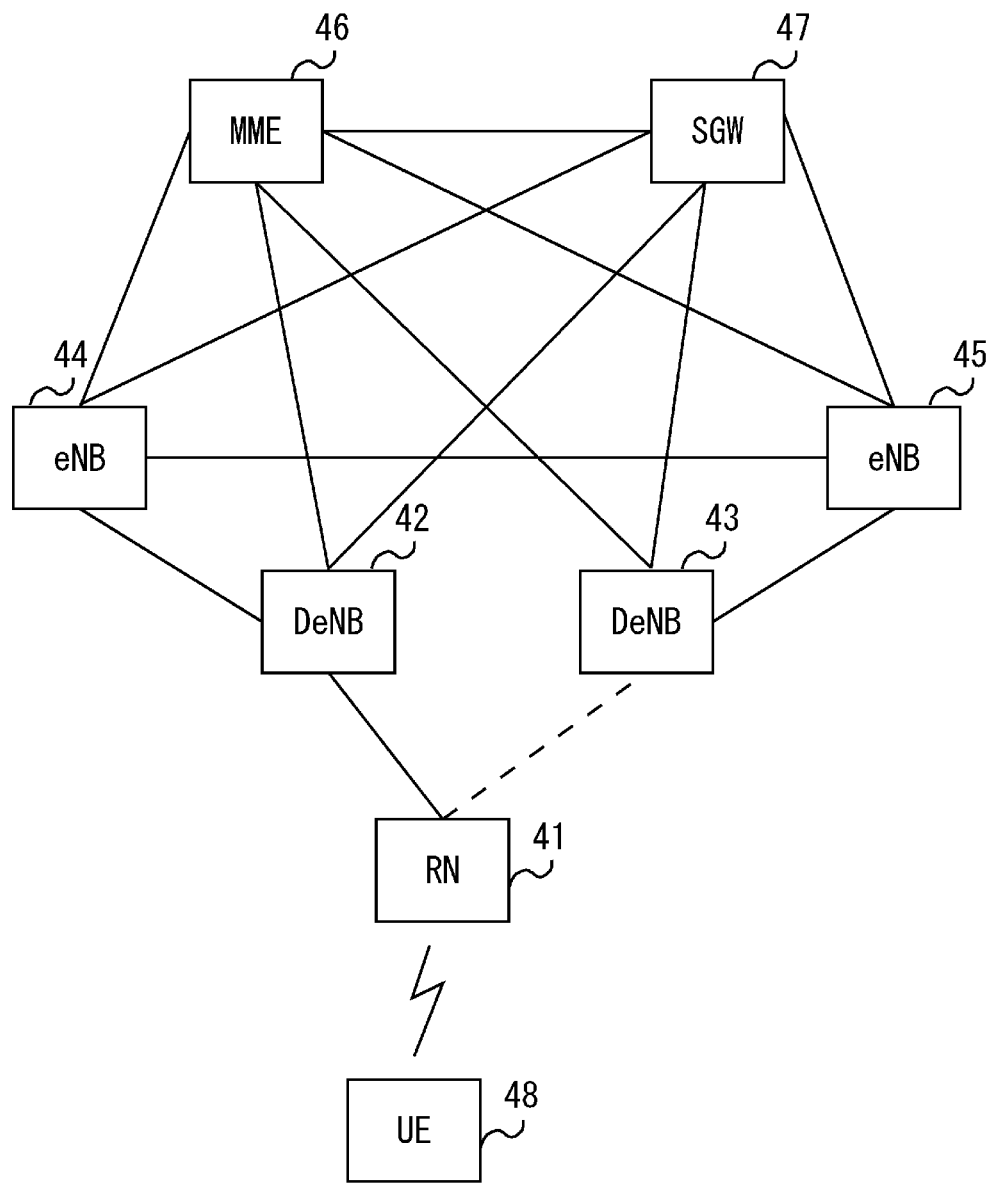
FIG. 2 is a configuration diagram of a communication system according to a second example embodiment.

Next, a configuration example of a communication system according to a second example embodiment is described with reference to FIG. 2. The communication system in FIG. 2 shows a mobile communication system defined in 3GPP. The communication system in FIG. 2 includes an RN 41, a DeNB 42, a DeNB 43, an eNB 44, an eNB 45, a Mobility Management Entity (MME) 46, a Serving Gateway (SGW) 47, and a UE 48. The RN 41 corresponds to the radio relay station 20 in FIG. 1. The DeNB42 and the DeNB43 correspond to the base station 10 in FIG. 1. The UE 48 corresponds to the communication terminal 30 in FIG. 1.

The MME 46 and the SGW 47 are nodes for configuring a core network, and may be referred to as core network nodes. The MME 46 performs, for example, control of bearers and connections related to the RN 41 and the UE 48. The SGW 47 processes user data transmitted or received by the RN 41 or the UE 48. Specifically, the SGW 47 performs transfer processing of user data, and so on.

The eNB 44 and the eNB 45 are base stations that support Long Term Evolution (LTE) as a radio communication system. Further, the DeNB 42 and the DeNB 43 are base stations that support LTE as a radio communication system. The DeNB 42 and DeNB 43 are base stations that connect to and control the RN 41, while the eNB 44 and the eNB45 do not connect to the RN 41. Connecting the RN 41 to the DeNB 42 may mean, for example, a condition in which the DeNB 42 can perform radio communication with the RN 41.

The RN 41 performs radio communication with the DeNB 42. Further, the RN 41 relays user data transmitted between the DeNB 42 and the UE 48. The dotted line between the RN 41 and the DeNB 43 indicates that the RN 41 can change the connection destination from the DeNB 42 to the DeNB 43. The processing of changing DeNB in the RN 41 is described later in detail.

The DeNB 42 can relay an X2 signaling message transmitted between the eNB 44 and the RN 41 by configuring an X2 interface with the eNB 44 and the RN 41. In other words, the DeNB 42 has X2 proxy functionality. The X2 signaling message is a control message transmitted on the X2 interface. Further, the X2 proxy functionality also includes relaying user data transmitted between the eNB 44 and the RN 41. The user data may be, for example, General Packet Radio Service (GPRS) Tunneling Protocol (GTP) data.

Further, the DeNB 42 can relay an S1 message between the RN 41 and the MME 46 and further between the RN 41 and the SGW 47 by configuring an S1 interface with the MME 46, the SGW 47, and the RN 41. In other words, DeNB 42 has S1 proxy functionality. Specifically, the S1 interface between the DeNB 42 and the MME 46 may be referred to as an S1-MME interface while the S1 interface between the DeNB 42 and the SGW 47 may be referred to as an S1-U interface.

Further, the DeNB 42 terminates a radio channel with the RN 41 and configures a Un interface with the RN 41. Configuring the Un interface may be rephrased, for example, as configuring a Radio Resource Control (RRC) Connection. The RN 41 terminates the X2 interface, the S1 interface, and the Un interface.

Further, the RN 41 terminates the radio channel with the UE 48 and configures the Uu interface with the UE 48. Further, the X2 interface is configured between the eNB 44 and the eNB 45. Further, various interfaces are configured with the DeNB 43 in a way similar to the way that they are configured with the DeNB 42.

Figure 3:
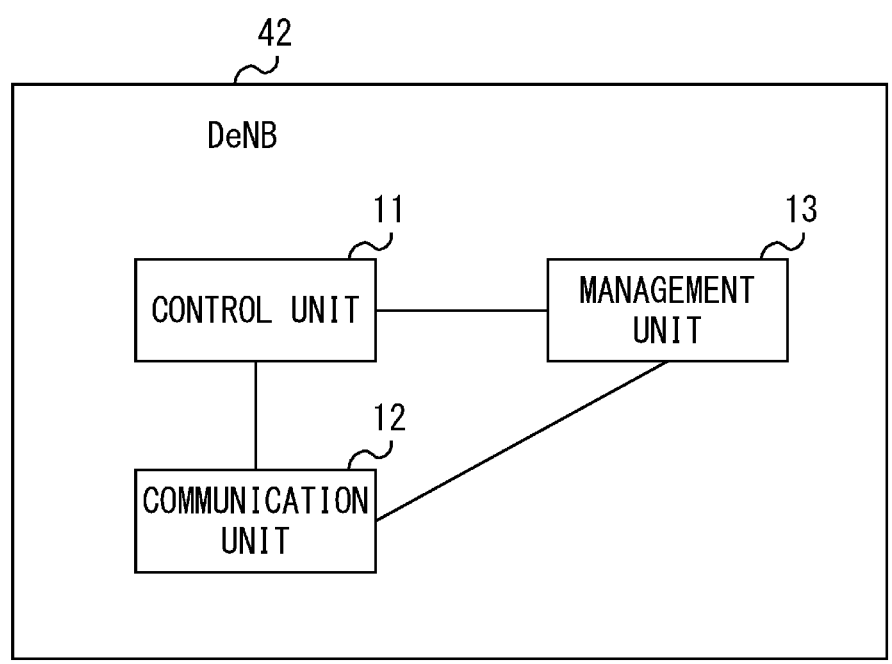
FIG. 3 is a configuration diagram of a DeNB according to the second example embodiment.

Next, a configuration example of the DeNB 42 according to the second example embodiment is described with reference to FIG. 3. A configuration of the DeNB 42 is the same as that of the base station 10 in FIG. 1 other than the addition of a management unit 13. Regarding FIG. 3, the management unit 13 having a configuration different from that in FIG. 1 is mainly described.

The management unit 13 manages the load conditions of the own apparatus and other DeNBs, for example, the DeNB 42 and the DeNB 43. Further, the management unit 13 may manage the load conditions of the eNB 44 and the eNB 45. For example, the management unit 13 manages information about the load condition of the own apparatus measured by the control unit 11. Further, the management unit 13 manages information about the load condition of the DeNB 43 transmitted from the DeNB 43. For example, the DeNB 42 may receive the information about the load condition of the DeNB 43 through the MME 46, and may receive the information about the load condition of the DeNB 43 through the eNB 45 and the eNB 44. Further, the management unit 13 may manage information about the load conditions of the eNB 44 and the eNB 45 transmitted therefrom.

Further, the management unit 13 may acquire the load conditions of the DeNB 42, the DeNB 43 and the like, for example, from an operation system or the like that manages the load conditions of the apparatuses constituting the network. Further, the management unit 13 may acquire the load conditions of the DeNB 42, the DeNB 43 and the like from the core network node. For example, the management unit 13 may acquire the load conditions of the DeNB 42, the DeNB 43 and the like from the MME 46, which is the core network, through the S1 interface.

The control unit 11 selects, when it detects that the DeNB 42 is in an overload condition, the DeNB that is not in an overload condition from among the DeNBs managed by the management unit 13. Further, the control unit 11 may select, when there are a plurality of DeNBs which are not in overload conditions, the DeNB having the lowest load. The control unit 11 transmits, when it detects that the DeNB 42 is in an overload condition, the identification information of the selected DeNB to the RN 41 through the communication unit 12.

Figure 4:
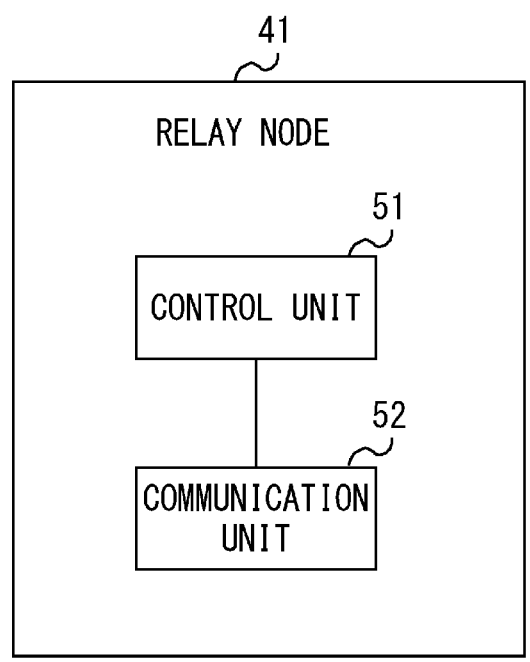
FIG. 4 is a configuration diagram of a relay node according to the second example embodiment.

Next, a configuration example of the RN 41 according to the second example embodiment is described with reference to FIG. 4. The RN 41 includes a control unit 51 and a communication unit 52. The components that compose the RN 41 such as the control unit 51 and the communication unit 52 may be software or modules of which the processing is executed by the processor executing the program stored in the memory. Alternatively, the components that compose the RN 41 may be hardware such as circuits or chips.

The communication unit 52 communicates with the DeNB 42 or the DeNB 43. A Un interface, an X2 interface, and an S1 interface are configured between the communication unit 52 and the DeNB 42 or the DeNB 43 that is in a connected state. The communication unit 52 receives identification information of another DeNB from the DeNB in a connected state when the DeNB in a connected state is brought into an overload condition. For example, the communication unit 52 which is connected to the DeNB 42 receives, when the DeNB 42 is brought into an overload condition, identification information about the DeNB 43 from the DeNB 42.

The control unit 51 determines, when it receives the identification information of the other DeNB from the DeNB connected through the communication unit 52, to cancel the connection to the DeNB in a connected state. Further, the control unit 51 determines to connect to the other DeNB using the received identification information.

The communication unit 52, for example, cancels the connection to the DeNB 42 in a connected state based on the determination by the control unit 51. Further, the communication unit 52 connects to the DeNB 43 using the identification information of the DeNB 43 transmitted from the DeNB 42.

The communication unit 52 communicates with the DeNB 42 or the DeNB 43 and also communicates with the UE 48.

Figure 5:
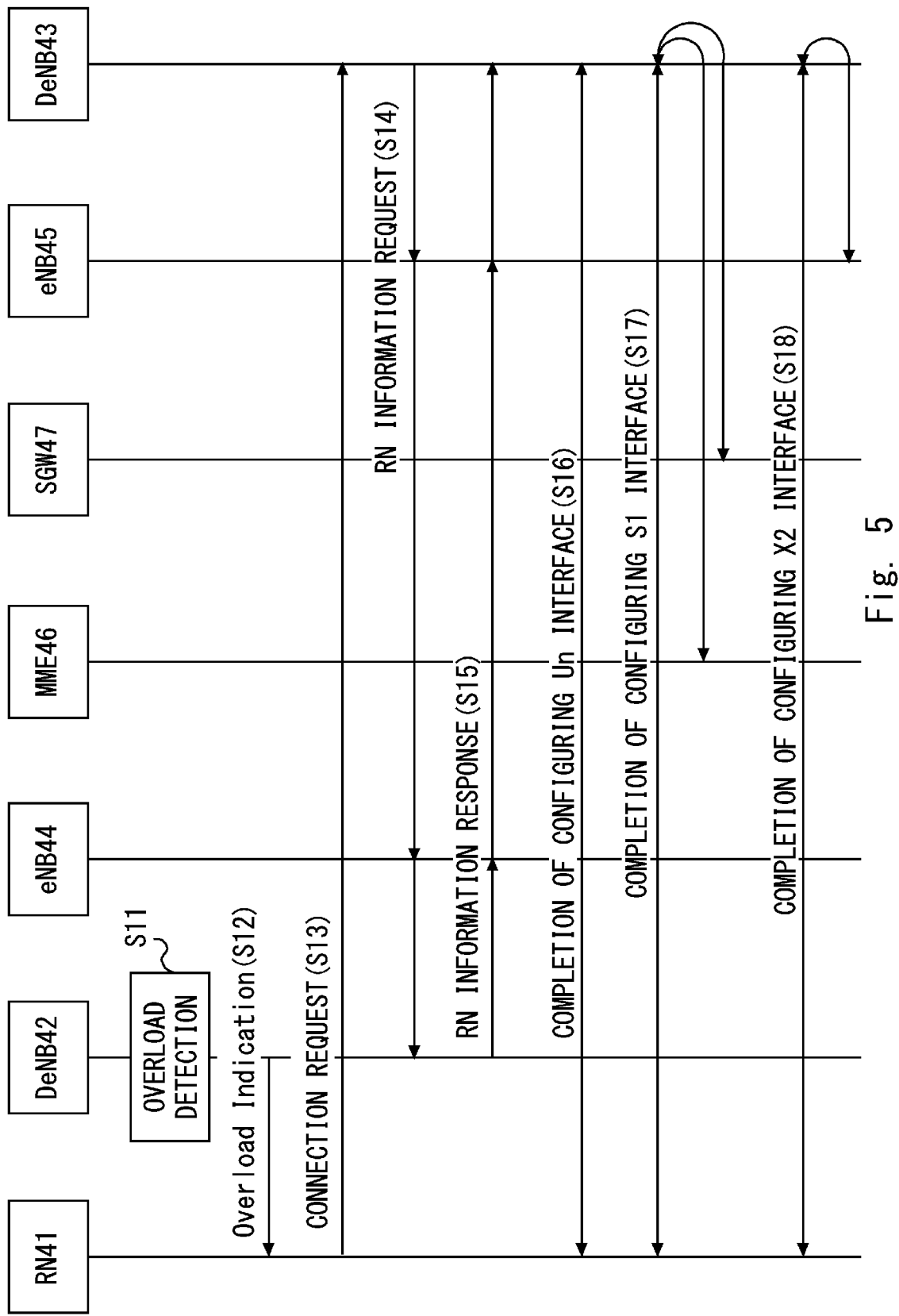
FIG. 5 is a diagram showing a processing flow when an overload is detected in the DeNB according to the second example embodiment.

Next, a processing flow when an overload is detected in the DeNB according to the second example embodiment is described with reference to FIG. 5. In FIG. 5, it is assumed that the RN 41 is connected to the DeNB 42. Further, it is assumed that the DeNB 43 is not in an overload condition.

First, the DeNB 42 detects that the own apparatus is in an overload condition (S11). Next, the DeNB 42 transmits an Overload Indication message to the RN 41 (S12). For example, the DeNB 42 may transmit an Overload Indication message to the RN 41 through the Un interface. The DeNB 42 may transmit an Overload Indication message to all the RNs in a connected state. Alternatively, the DeNB 42 may transmit an Overload Indication message to any number of RNs from among the RNs in a connected state. For example, the DeNB 42 may measure the amount of data processing for each RN, select the RN having a large amount of data processing or the RN having a small amount of data processing, and transmit an Overload Indication message.

The Overload Indication message is used to notify the RN 41 that the DeNB 42 is in an overload condition. The Overload Indication message includes identification information of the DeNB 43 that is not in an overload condition.

Next, the RN 41 transmits a connection request message to the DeNB 43 by using the identification information of the DeNB 43 included in the Overload Indication message (S13). The connection request message includes identification information about the DeNB 42 currently in a connected state.

Next, the DeNB 43 transmits, through the eNB45 and the eNB44, an RN information request message to the DeNB 42 to which the RN41 connects (S14). Alternatively, the DeNB 43 may transmit an RN connection information request message to the DeNB 42 through the MME 46.

Next, the DeNB 42 transmits an RN information response message to the DeNB 43 through the eNB 44 and the eNB 45 as a response message to the RN information request message (S15). An RN information response message may include information necessary for the DeNB 43 to establish a session with the RN 41. For example, an RN information response message may include address information assigned to the RN 41, security parameters related to the RN 41, and the like. Further, the DeNB 42 may transmit an RN information response message to the DeNB 43 through the MME 46.

Next, the DeNB 43 configures the Un interface with the RN 41 (S16). Then, the DeNB 43 configures the S1-MME interface with the RN 41 and with the MME 46 (S17). Further, the DeNB 43 configures the S1-U interface with the RN 41 and with the SGW 47 (S17).

Next, the DeNB 43 configures the X2 interface with the RN 41 and with the eNB 45 (S18). Further, the RN 41 cancels the connection with the DeNB 42 at any timing from when the Overload Indication message has been received in Step S12 to when the X2 interface has been configured in Step S18. Canceling a connection may mean canceling the configuration of the Un interface, the X2 interface, and the S1 interface configured between the RN 41 and the DeNB 42.

Figure 6:
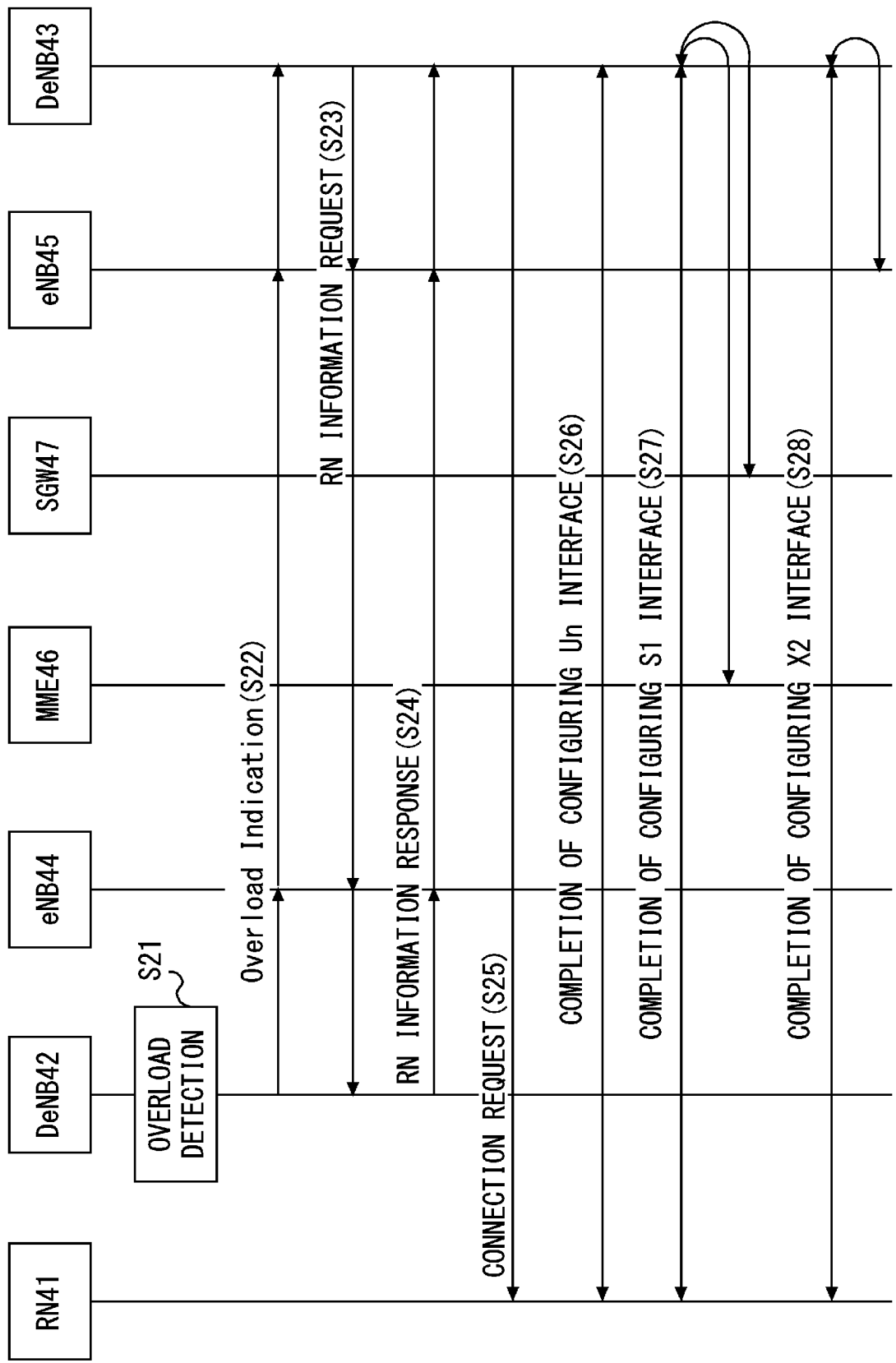
FIG. 6 is a diagram showing a processing flow when an overload is detected in the DeNB according to the second example embodiment.

Next, a processing flow when an overload is detected in the DeNB that is different from that in FIG. 5 is described with reference to FIG. 6. First, the DeNB 42 detects that the own apparatus is in an overload condition (S21). Then, the DeNB 42 transmits an Overload Indication message to the DeNB 43 through the eNB 44 and the eNB 45 (S22). The Overload Indication message is used to notify the DeNB 43 that the DeNB 42 is in an overload condition. The Overload Indication message may include information identifying the RN 41 in a connected state. Further, the DeNB 42 may transmit an Overload Indication message to the DeNB 43 through the MME 46.

The DeNB 42 manages the load conditions of the surrounding DeNBs, and, for example, selects the DeNB that is not in an overload condition or the DeNB that is in the lowest load condition. The DeNB 42 transmits an Overload Indication message to the selected DeNB 43.

Next, the DeNB 43 transmits an RN information request message to the DeNB 42 through the eNB 45 and the eNB 44 (S23). Alternatively, the DeNB 43 may transmit an RN connection information request message to the DeNB 42 through the MME 46. The DeNB 43 may transmit, in order to request information about the RN41, an RN information request message in which the identification information of the RN41 is set, to the DeNB 42.

Next, the DeNB 42 transmits an RN information response message to the DeNB 43 through the eNB44 and the eNB45 as a response message to the RN information request message (S24). Alternatively, the DeNB 42 may transmit an RN information response message to the DeNB 43 through the MME 46. When the identification information of a specific RN, for example, the RN41 is configured in the RN information request message, the DeNB 42 may include, in the RN information response message, information required to establish a session with the RN 41. Alternatively, when a specific RN is not set in the RN information request message, the DeNB 42 may include, in the RN information response message, information required to establish a session with each RN connected to the DeNB 42.

Next, the DeNB 43 transmits a connection request message to each of the RNs by using the information included in the RN information response message (S25). FIG. 6 shows that the DeNB 43 transmits the connection request message to the RN41.

Steps S26 to S28 are the same as Steps S16 to S18, and thus detailed descriptions thereof will be omitted.

As described above, using the communication system according to the second example embodiment enables the DeNB to transmit identification information of the DeNB different from that of the own apparatus to the RN when the DeNB is brought into an overload condition. The RN can change, when it receives identification information of another DeNB from the DeNB in a connected state, the connection destination from the DeNB in the connected state to the other specified DeNB. Accordingly, the UE connected to the RN 41 and the RN 41 can perform communication even if the DeNB is brought into an overload condition.

Third Example Embodiment

Figure 7:
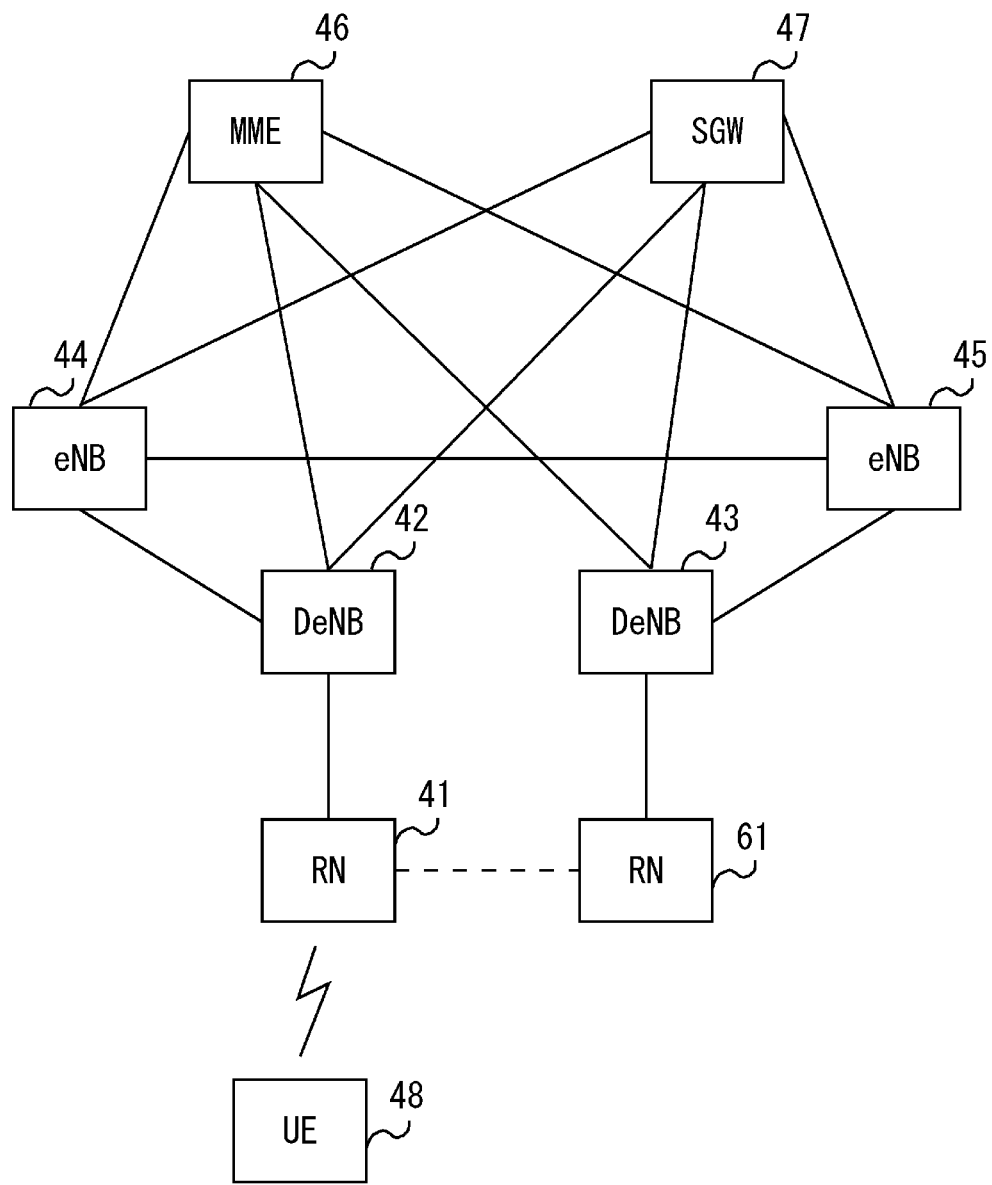
FIG. 7 is a configuration diagram of a communication system according to a third example embodiment.

Next, a configuration example of a communication system according to a third example embodiment is described with reference to FIG. 7. In the communication system shown in FIG. 7, the RN 41 communicates with the DeNB 43 through an RN 61. Other configurations in FIG. 7 is the same as that in FIG. 2, and thus detailed descriptions thereof will be omitted. The dotted line between the RN 41 and the RN 61 in FIG. 7 indicates that the RN 41 first communicates with the DeNB 42 and then changes the connection destination from the DeNB 42 to the RN 61.

The RN 41 may configure a Uu interface with the RN 61 when it connects to the RN 61. Further, the RN 41 executes Uu proxy functionality when the Uu interface is configured between the RN 41 and the UE 48. Alternatively, the RN 41 may connect to the UE 48 by using near field communication such as Bluetooth (registered trademark) or may connect using wireless LAN communication. Alternatively, the RN 41 may communicate with the UE 48 by using Proximity Service (ProSe) that is a communication system that 3GPP defines for performing Device to Device (D2D) communication.

Figure 8:
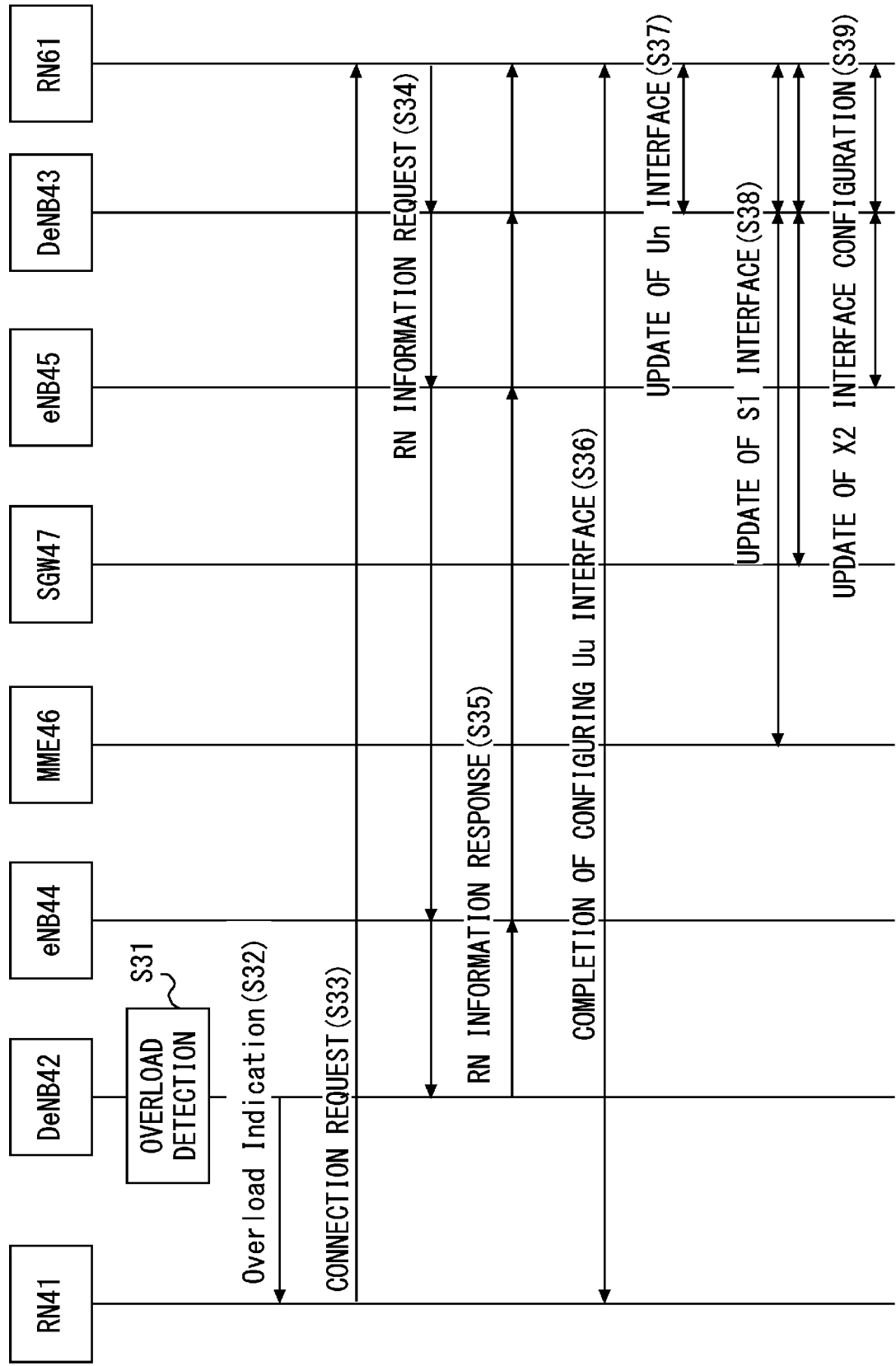
FIG. 8 is a diagram showing a processing flow when an overload is detected in a DeNB according to the third example embodiment.

Next, a processing flow when an overload is detected in the DeNB according to the third example embodiment is described with reference to FIG. 8. In FIG. 8, it is assumed that the RN 41 is connected to the DeNB 42. Further, it is assumed that the DeNB 43 is not in an overload condition.

First, the DeNB 42 detects that the own apparatus is in an overload condition (S31). Next, the DeNB 42 transmits an Overload Indication message to the RN 41 (S32).

The Overload Indication message is used to notify the RN 41 that the DeNB 42 is in an overload condition. The Overload Indication message includes identification information of the RN 61 connected to the DeNB 43 that is not in an overload condition. The DeNB 42 may receive, when it receives information about the load conditions of other DeNBs, the identification information of the RN connected to each of the DeNBs together with that former information.

Next, the RN 41 transmits a connection request message to the RN 61 by using the identification information of the RN 61 included in the Overload Indication message (S33). The connection request message includes identification information about the DeNB 42 currently in a connected state.

Next, the RN 61 transmits, through the DeNB 43, the eNB45, and the eNB44, an RN information request message to the DeNB 42 to which the RN41 connects (S34). Alternatively, the RN 61 may transmit an RN information request message to the DeNB 42 through the DeNB 43 and the MME 46.

Next, the DeNB 42 transmits an RN information response message to the RN 61 through the eNB 44, the eNB 45, and the DeNB 43 as a response message to the RN information request message (S35). Alternatively, the DeNB 42 may transmit an RN information response message to the RN 61 through the MME 46 and the DeNB 43. An RN information response message may include information necessary for the RN 61 to establish a session with the RN 41. For example, an RN information response message may include address information assigned to the RN 41, security parameters related to the RN 41, and the like.

Next, the RN 61 configures the Uu interface with the RN 41 (S36). Next, the DeNB 43 updates the configuration of the Un interface with the RN 61 in response to the RN 41 and the RN 61 being connected to each other (S37). Further, the DeNB 43 updates the configuration of the S1-MME interface with the RN 61 and with the MME 46 in response to the RN 41 and the RN 61 being connected to each other (S38). Further, the DeNB 43 updates the configuration of the S1-U interface with the RN 61 and with the SGW 47 in response to the RN 41 and the RN 61 being connected to each other (S38).

Next, the DeNB 43 updates the configuration of the X2 interface with the RN 61 and with the eNB 45 in response to the RN 41 and the RN 61 being connected to each other (S39).

Figure 9:
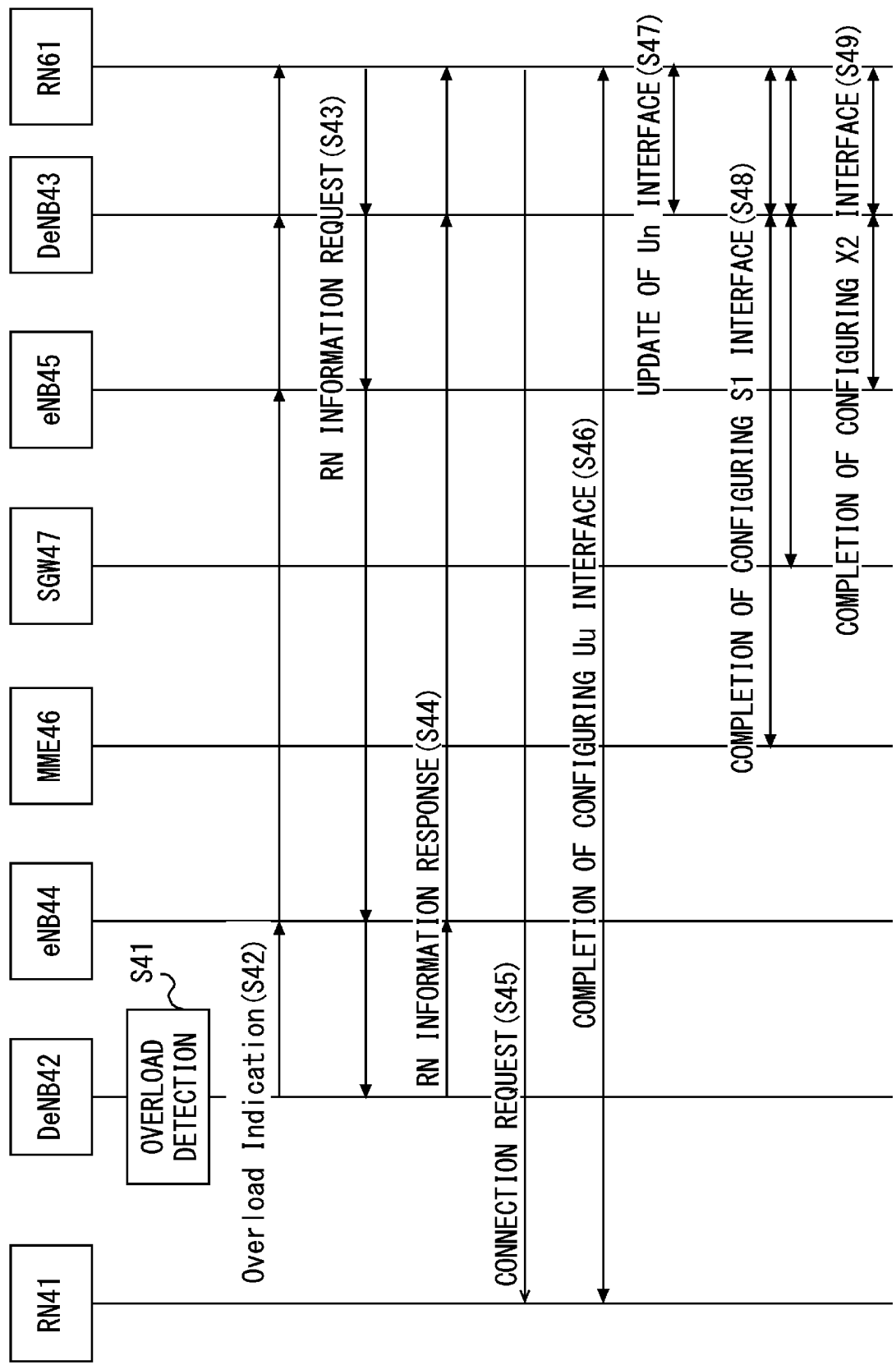
FIG. 9 is a diagram showing a processing flow when an overload is detected in the DeNB according to the third example embodiment.

Next, a processing flow when an overload is detected in the DeNB that is different from that in FIG. 9 is described with reference to FIG. 9. First, the DeNB 42 detects that the own apparatus is in an overload condition (S41). Then, the DeNB 42 transmits an Overload Indication message to the RN 61 through the eNB 44, the eNB 45, and DeNB 43 (S42). Alternatively, the DeNB 42 may transmit an Overload Indication message to the RN 61 through the MME 46 and the DeNB 43. The Overload Indication message is used to notify the RN 61 that the DeNB 42 is in an overload condition. The Overload Indication message may include information identifying the RN 41 in a connected state. The DeNB 42 may receive, when it receives information about the load conditions of other DeNBs, the identification information of the RN connected to each of the DeNBs together with that former information.

Next, the RN 61 transmits an RN information request message to the DeNB 42 through the DeNB 43, the eNB 45, and the eNB 44 (S43). Alternatively, the RN 61 may transmit an RN information request message to the DeNB 42 through the DeNB 43 and the MME 46. The RN 61 may transmit, in order to request information about the RN41, an RN information request message, in which the identification information of RN41 is set, to the DeNB 42.

Next, the DeNB 42 transmits an RN information response message to the RN 61 through the eNB44, the eNB45, and the DeNB 43 as a response message to the RN information request message (S44). Alternatively, the DeNB 42 may transmit an RN information response message to the RN 61 through the MME 46 and the DeNB 43. When the identification information of a specific RN, for example, the RN41 is configured in the RN information request message, the DeNB 42 may include, in the RN information response message, information required to establish a session with the RN 41. Alternatively, when a specific RN is not set in the RN information request message, the DeNB 42 may include, in the RN information response message, information required to establish a session with each RN connected to the DeNB 42.

Next, the RN 61 transmits a connection request message to each of the RNs by using the information included in the RN information response message (S45). FIG. 9 shows that the RN 61 transmits the connection request message to the RN41.

Steps S46 to S49 are the same as Steps S36 to S39, and thus detailed descriptions thereof will be omitted.

As described above, using the communication system according to the third example embodiment enables the RN 41 to communicate with the DeNB 43, which is not in an overload condition, through the RN 61 when the DeNB 42 is brought into an overload condition. Accordingly, the UE connected to the RN 41 and the RN 41 can perform communication even if the DeNB is brought into an overload condition.

Although the present disclosure has been described as a hardware configuration in the above example embodiments, it is not limited thereto. The present disclosure may be implemented by causing a Central Processing Unit (CPU) to execute a computer program to perform processing in the communication terminal, the radio relay station, and the base station.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the aforementioned example embodiments and may be changed as appropriate without departing from the spirit of the present disclosure. Further, the present disclosure may be implemented by combining the example embodiments as appropriate.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

This application is based upon and claims the benefit of priority from Japanese Patent Application No. 2017-056954, filed on Mar. 23, 2017, the disclosure of which is incorporated herein in its entirety by reference.

For example, the whole or part of the example embodiments disclosed above can be described as, but not limited to, the following supplementary notes.

(Supplementary Note 1)

A base station configured to communicate with a communication terminal through a radio relay station, the base station comprising:

a control unit configured to detect whether the own apparatus is in an overload condition exceeding a predetermined load; and a communication unit configured to transmit, in order to cause the radio relay station to connect to another base station that is not in an overload condition, information about the other base station to the radio relay station when the control unit detects that the own apparatus is in an overload condition.

(Supplementary Note 2)

The base station described in Supplementary note 1, further comprising a management unit configured to manage a load condition of another station, wherein the communication unit transmits, to the radio relay station, information about the other base station that is not in an overload condition.

(Supplementary Note 3)

The base station described in Supplementary note 2, wherein the management unit manages the load condition of the own apparatus with the load condition of the other base station, and the communication unit transmits, when the management unit detects that the own apparatus is in an overload condition, the information about the other base station and information indicating that the own apparatus is in an overload condition to the radio relay station by using a Un interface.

(Supplementary Note 4)

The base station described in Supplementary note 2, wherein the management unit manages the load condition of the own apparatus with the load condition of the other base station, and the communication unit transmits, when the management unit detects that the own apparatus is in an overload condition, the information indicating that the own apparatus is in an overload condition to the other base station.

(Supplementary Note 5)

A radio relay station configured to relay communications between a base station and a communication terminal, the radio relay station comprising a communication unit configured to cancel, when information about a second base station that is different from a first base station in a connected state is received from the first base station that is in an overload condition exceeding a predetermined load, a connection to the first base station and connect to the second base station.

(Supplementary Note 6)

The radio relay station described in Supplementary note 5, wherein the communication unit, with the second base station, establishes an RRC connection and further configures an S1 interface and an X2 interface.

(Supplementary Note 7)

The radio relay station described in Supplementary note 6, wherein the communication unit receives information about the second base station through the Un interface.

(Supplementary Note 8)

The radio relay station described in Supplementary note 6, wherein the communication unit receives the information about the second base station by receiving a connection request message transmitted from the second base station.

(Supplementary Note 9)

A communication method performed in a base station configured to communicate with a communication terminal through a radio relay station, the communication method comprising:

detecting whether the base station is in an overload condition exceeding a predetermined load; and transmitting, in order to cause the radio relay station to connect to another base station that is not in an overload condition, information about the other base station to the radio relay station.

(Supplementary Note 10)

A communication method performed in a radio relay station configured to relay communications between a base station and a communication terminal, the communication method comprising:

receiving, from a first base station that is in an overload condition exceeding a predetermined load, information about a second base station that is different from the first base station in a connected state; and canceling a connection to the first base station and connecting to the second base station based on the received information.

(Supplementary Note 11)

A program for causing a computer that is a base station configured to communicate with a communication terminal through a radio relay station, the program causing the computer to execute:

detecting whether the base station is in an overload condition exceeding a predetermined load; and transmitting, in order to cause the radio relay station to connect to another base station that is not in an overload condition, information about the other base station to the radio relay station.

(Supplementary Note 12)

A program for causing a computer that is a radio relay station configured to relay communications between a base station and a communication terminal, the program causing the computer to execute:

receiving, from a first base station that is in an overload condition exceeding a predetermined load, information about a second base station that is different from the first base station in a connected state, and canceling a connection to the first base station and connecting to the second base station based on the received information.

REFERENCE SIGNS LIST

10 BASE STATION
11 CONTROL UNIT
12 COMMUNICATION UNIT
13 MANAGEMENT UNIT
20 RADIO RELAY STATION
30 COMMUNICATION TERMINAL
41 RN

42 DeNB
43 DeNB
44 eNB
45 eNB
46 MME
47 SGW
48 UE
51 CONTROL UNIT
52 COMMUNICATION UNIT
61 RN

The invention claimed is:

1. A radio relay station configured to relay communications between a base station and a communication terminal, the radio relay station comprising
- at least one memory storing instructions, and
- at least one processor configured to execute the instructions to;
- cancel, when the radio relay station receives a connection request message from a second base station that is different from a first base station that is in a connected state and in an overload condition exceeding a predetermined load, a connection to the first base station and connect to the second base station.

2. The radio relay station according to claim 1, wherein the at least one processor is further configured to execute the instructions to, with the second base station, establish an RRC connection and further configure an S1 interface and an X2 interface.

3. The radio relay station according to claim 2, wherein the at least one processor is further configured to execute the instructions to receive information about the second base station through a Un interface.

4. The radio relay station according to claim 2, wherein the at least one processor is further configured to execute the instructions to receive the information about the second base station by receiving the connection request message transmitted from the second base station.

5. A communication method performed in a radio relay station configured to relay communications between a base station and a communication terminal, the communication method comprising:
- receiving a connection request message from a second base station that is different from a first base station that is in a connected state and in an overload condition exceeding a predetermined load;
- canceling a connection to the first base station; and
- connecting to the second base station.

* * * * *